United States Patent
Shin et al.

(10) Patent No.: US 12,344,252 B2
(45) Date of Patent: Jul. 1, 2025

(54) METHOD OF CONTROLLING TOWING MODE OF VEHICLE

(71) Applicants: Hyundai Motor Company, Seoul (KR); Kia Corporation, Seoul (KR)

(72) Inventors: Dong Jun Shin, Gyeonggi-Do (KR); Hyo Jun Kawk, Gyeonggi-Do (KR); Jin Cheol Shin, Gyeonggi-Do (KR); Kyung Hun Hwang, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 205 days.

(21) Appl. No.: 18/065,404

(22) Filed: Dec. 13, 2022

(65) Prior Publication Data

US 2023/0356717 A1 Nov. 9, 2023

(30) Foreign Application Priority Data

May 4, 2022 (KR) .................. 10-2022-0055144

(51) Int. Cl.
*B60W 30/182* (2020.01)
*B60L 58/13* (2019.01)
(Continued)

(52) U.S. Cl.
CPC ........... *B60W 30/182* (2013.01); *B60L 58/13* (2019.02); *B60W 20/14* (2016.01);
(Continued)

(58) Field of Classification Search
CPC .. B60W 30/182; B60W 20/14; B60W 30/143; B60W 30/18063;
(Continued)

(56) References Cited

U.S. PATENT DOCUMENTS

| 11,794,745 B2 * | 10/2023 | Shin ........................ B60L 53/66 |
| 2020/0164890 A1 | 5/2020 | Shin et al. | |
| 2023/0271508 A1 * | 8/2023 | Healy ....................... B60L 7/18 |
| | | | 180/2.2 |

FOREIGN PATENT DOCUMENTS

JP        2013184584 A    *  9/2013

OTHER PUBLICATIONS

English translation of Tanabe et al. (JP 2013184584 (Year: 2013).*

* cited by examiner

*Primary Examiner* — Abby J Flynn
*Assistant Examiner* — Kyle J Kingsland
(74) *Attorney, Agent, or Firm* — Fox Rothschild LLP

(57) ABSTRACT

The present disclosure provides a method of controlling a towing mode of an vehicle, which may easily charge a battery of a towed vehicle by allowing a motor of the towed vehicle to output a charging torque for charging the battery and allowing a motor of the towed vehicle to output a creep torque or a regenerative braking torque capable of charging the battery even upon deceleration traveling together with a compensation control of increasing engine output power of a towing vehicle compared to default output power upon acceleration and constant speed traveling by selecting one of an eco-towing mode, a power towing mode, and a target charging towing mode for charging the battery of the towed vehicle when the towing vehicle, which is a hybrid electric vehicle, tows the towed vehicle, which is an electric vehicle or a hybrid electric vehicle.

20 Claims, 10 Drawing Sheets

(51) Int. Cl.
*B60W 20/14* (2016.01)
*B60W 30/14* (2006.01)
*B60W 30/18* (2012.01)
*B60W 40/076* (2012.01)

(52) U.S. Cl.
CPC .... *B60W 30/143* (2013.01); *B60W 30/18063* (2013.01); *B60W 30/18127* (2013.01); *B60W 40/076* (2013.01); *B60L 2200/28* (2013.01); *B60L 2240/642* (2013.01); *B60L 2260/26* (2013.01); *B60W 2300/14* (2013.01); *B60W 2510/0657* (2013.01); *B60W 2510/244* (2013.01); *B60W 2530/203* (2020.02); *B60W 2552/15* (2020.02); *B60W 2710/0666* (2013.01); *B60W 2710/083* (2013.01)

(58) Field of Classification Search
CPC ......... B60W 30/18127; B60W 40/076; B60W 2300/14; B60W 2510/0657; B60W 2510/244; B60W 2530/203; B60W 2552/15; B60W 2710/0666; B60W 2710/083; B60W 10/06; B60W 10/08; B60W 10/26; B60W 20/13; B60W 50/082; B60L 58/13; B60L 2200/28; B60L 2240/642; B60L 2260/26; B60L 15/20; B60L 53/57; B60L 53/66; B60L 7/10; B60L 2240/423; B60L 2240/443
See application file for complete search history.

FIG. 7
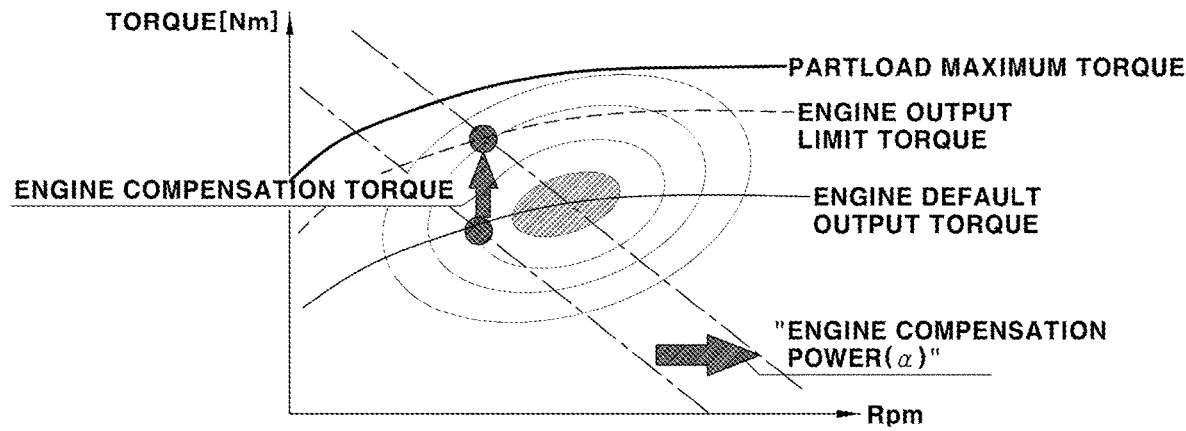
FIG. 8
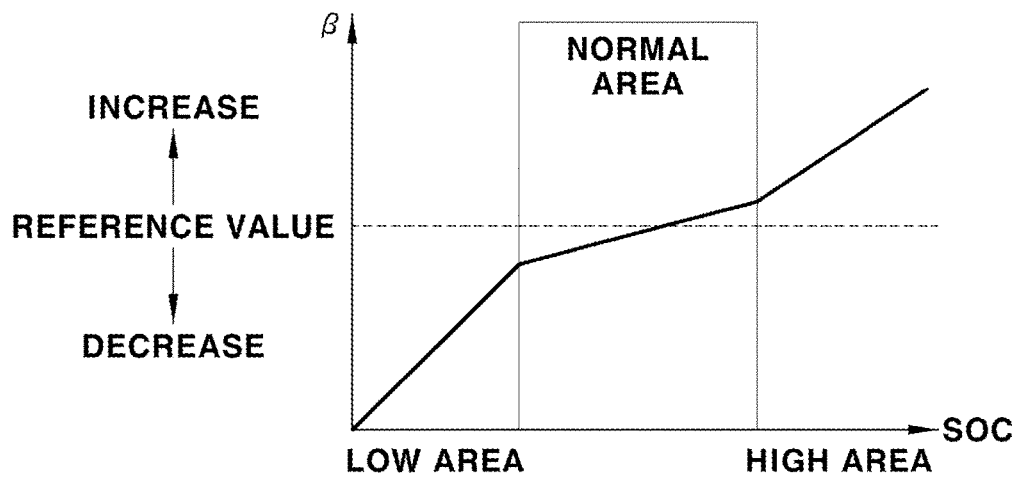
FIG. 9
| γ | LOW SPEED | MEDIUM SPEED | HIGH SPEED |
|---|---|---|---|
| DOWNHILL | INCREASE | | |
| FLAT GROUND | | | |
| UPHILL | | | DECREASE |

METHOD OF CONTROLLING TOWING MODE OF VEHICLE

CROSS-REFERENCE TO RELATED APPLICATION

This application claims under 35 U.S.C. § 119(a) the benefit of priority to Korean Patent Application No. 10-2022-0055144 filed on May 4, 2022, the entire contents of which are incorporated herein by reference.

BACKGROUND

(a) Technical Field

The present disclosure relates to a method of controlling a towing mode of a vehicle, and more specifically, to a method of controlling a towing mode of a vehicle, which may easily charge a battery of a towed vehicle through a compensation control of increasing engine output power of a towing vehicle or the like when the towing vehicle tows the towed vehicle.

(b) Background Art

As is well known, a vehicle includes a hybrid electric vehicle using an engine and a motor as a traveling drive source, an electric vehicle using a motor as the traveling drive source, a fuel cell vehicle, and the like.

When an owner who owns two or more types of vehicles according to the purpose of use needs to use all of two or more types of vehicles at a desired destination, he/she may take all of the two or more types of vehicles to the desired destination using a neutral towing function.

For example, the owner may take all of the two or more vehicles to the desired destination by setting one vehicle to a towing vehicle that actually travels, and setting the other vehicle to a towed vehicle connected to a rear of the towing vehicle by a predetermined towing device.

The neutral towing function refers to a function that sets a shift stage of the towed vehicle towed by the towing vehicle to a neutral so that the towed vehicle may be maintained in a no-load state and easily towed.

However, there is a problem in that even when a battery of the towed vehicle, which is a vehicle, needs to be charged, the towed vehicle may not be used immediately at the desired destination as the towed vehicle is towed to the desired destination in the no-load state.

Accordingly, a method of charging the battery of the towed vehicle is required when the towing vehicle travels in a state of towing the towed vehicle in order to improve merchantability of the vehicle and expect additional benefits.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

The present disclosure has been made in efforts in consideration of the above point, and an object of the present disclosure is to provide a method of controlling a towing mode of an vehicle, which may easily charge a battery of a towed vehicle by executing one of an eco-towing mode, a power towing mode, and a target charging towing mode in which a battery of the towed vehicle is charged when a towing vehicle, which is a hybrid electric vehicle, tows the towed vehicle, which is an electric vehicle or a hybrid electric vehicle, to allow a motor of the towed vehicle to output a charging torque for charging the battery together with a compensation control of increasing engine output power of the towing vehicle compared to default output power upon acceleration and constant speed traveling.

In one aspect, q method of controlling a towing mode of a vehicle, the method comprising: a) determining whether to perform a towing mode in which a battery of a towed vehicle is charge as a towing vehicle, tows the towed vehicle, the towed vehicle being a hybrid electric vehicle or an electric vehicle; b) executing one of: an eco-towing mode, a power towing mode, and a target charging towing mode for charging the battery of the towed vehicle if the towing mode is determined to be performed; and c) outputting a charging torque for charging the battery of the towed vehicle by a motor of the towed vehicle, the charging torque being in proportion to engine compensation power of the towing vehicle upon acceleration and constant speed traveling if any one of the eco-towing mode, the power towing mode, and the target charging towing mode is executed.

In certain preferred aspects, the towing vehicle is a hybrid electric vehicle. In certain aspects, the towing vehicle may by powered by any of suitable systems, including an electric-powered vehicle, or a gas-powered vehicle such as gas combustion type recreational utility vehicle In addition, another object of the present disclosure is to provide a method of controlling a towing mode of a vehicle, which may easily charge a battery of a towed vehicle by executing one of an eco-towing mode, a power towing mode, and a target charging towing mode in which the battery of the towed vehicle is charged when a towing vehicle, which suitably is a hybrid electric vehicle or other type of vehicle such as an electric vehicle or a gas-powered vehicle as discussed above, tows the towed vehicle, which is an electric vehicle or a hybrid electric vehicle to allow a motor of the towed vehicle to output a creep torque or a regenerative braking torque while allowing a motor of the towing vehicle to output the creep torque upon deceleration traveling.

In order to achieve the objects, the present disclosure provides a method of controlling a towing mode of an vehicle including: determining whether a towing mode in which a battery of a towed vehicle is charged is performed when a towing vehicle, which is a hybrid electric vehicle, tows the towed vehicle, which is an vehicle; selecting one of an eco-towing mode, a power towing mode, and a target charging towing mode in which the battery of the towed vehicle is charged when the towing mode is determined to be performed; outputting a charging torque for charging the battery by a motor of the towed vehicle in proportion to engine compensation power of the towing vehicle upon acceleration and constant speed traveling when any one of the eco-towing mode, the power towing mode, and the target charging towing mode is executed; and outputting a creep torque or a regenerative braking torque for charging the battery by the motor of the towed vehicle upon deceleration traveling when one of the eco-towing mode, the power towing mode, and the target charging towing mode is executed.

The present disclosure provides the following effects through the above configuration.

First, it is possible to easily charge the battery of the towed vehicle by selecting one of the eco-towing mode, the power towing mode, and the target charging towing mode in which the battery of the towed vehicle is charged when the towing vehicle, which is the hybrid electric vehicle, tows the towed vehicle, which is the hybrid electric vehicle or the electric vehicle to the desired destination to allow the motor of the towed vehicle to output the charging torque for charging the battery upon acceleration and constant speed traveling.

Second, it is possible to easily charge the battery of the towed vehicle by allowing the motor of the towed vehicle to output the creep torque or the regenerative braking torque while allowing the motor of the towing vehicle to output the creep torque even upon deceleration traveling.

Third, it is possible to improve merchantability and improve convenience of the vehicle such as immediately using the towed vehicle upon reaching the desired destination by allowing the battery of the towed vehicle to be charged when the towing vehicle, which is suitably is a hybrid electric vehicle or electric-powered vehicle, or a gas-powered vehicle such as gas combustion type recreational utility vehicle as discussed above, tows the towed vehicle, which is the hybrid electric vehicle or the electric vehicle to the desired destination.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein:

FIG. 7 is a torque-speed line diagram showing that an engine output limit torque and engine compensation power are determined in the eco-towing mode in the method of controlling the towing mode of the vehicle according to the present disclosure;

FIG. 8 is a graph showing a first compensation factor $\beta$ for each battery state of charge (SOC) level for determining engine compensation power $\alpha$ of the towing vehicle in the eco-towing mode in the method of controlling the towing mode of the vehicle according to the present disclosure;

FIG. 9 is a table showing a second compensation factor $\gamma$ for each road shape for determining the engine compensation power $\alpha$ of the towing vehicle in the method of controlling the towing mode of the vehicle according to the present disclosure;

Figure 1:
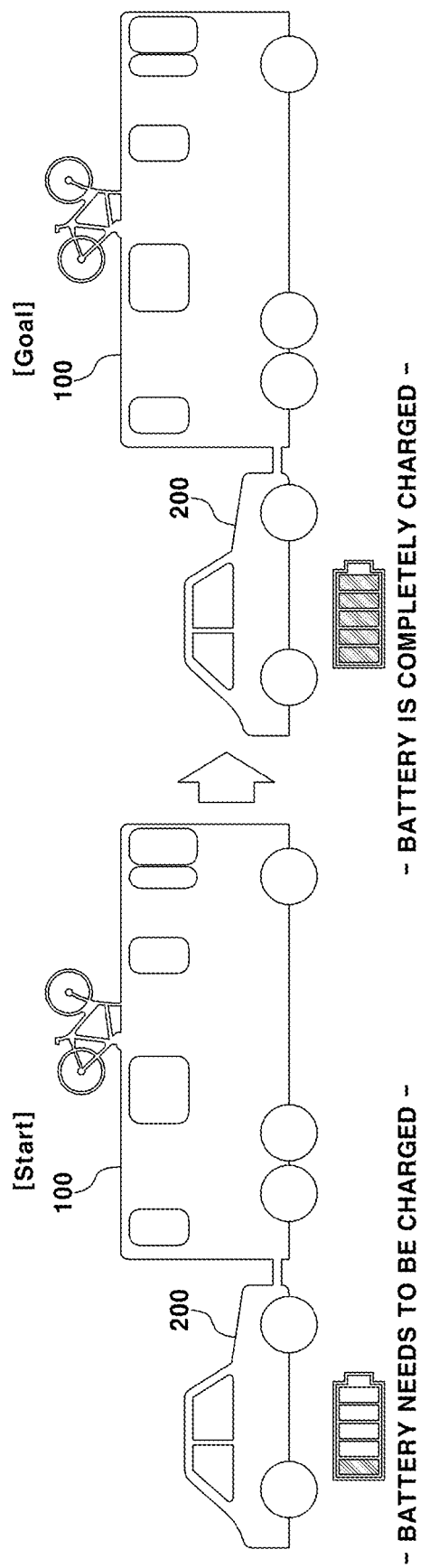
FIG. 1 is a schematic view showing a concept of a method of controlling a towing mode of an vehicle according to the present disclosure.

It should be understood that the appended drawings are not necessarily to scale, presenting a somewhat simplified representation of various example features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, example embodiments of the present disclosure will be described in detail with reference to the accompanying drawings.

FIG. 1 is a schematic view showing a concept of a method of controlling a towing mode of an vehicle according to the present disclosure, wherein reference numeral 100 denotes a towing vehicle that is a hybrid electric vehicle, and reference numeral 200 denotes a towed vehicle that is an vehicle such as a hybrid electric vehicle or an electric vehicle.

As shown in FIG. 1, the method of controlling the towing mode according to the present disclosure is mainly characterized in that when the towing vehicle 100, which is the hybrid electric vehicle, tows the towed vehicle 200, which is an vehicle including the hybrid electric vehicle, the electric vehicle, or the like to a desired destination, it is possible to easily charge a battery of the towed vehicle 200 when the battery of the towed vehicle 200 needs to be charged.

Figure 2:
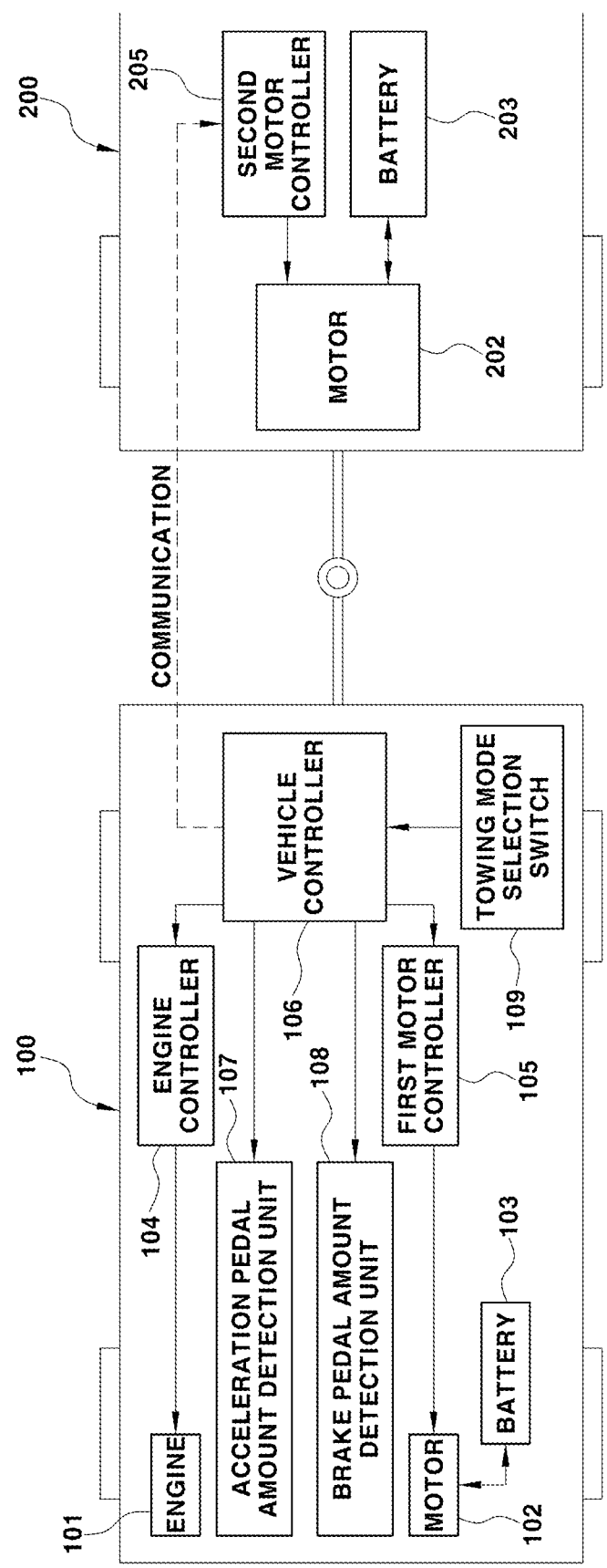
FIG. 2 is a configuration diagram for the method of controlling the towing mode of the vehicle according to the present disclosure.

FIG. 2 is a configuration diagram for the method of controlling the towing mode of the vehicle according to the present disclosure.

As shown in FIG. 2, the hybrid electric vehicle, which is the towing vehicle 100, is equipped with an engine 101, a motor 102, a battery 103 connected to the motor 102 to be chargeable and dischargeable, and the like, and also includes an engine controller 104 configured to control the engine 101, a first motor controller 105 configured to control the motor 102, and a vehicle controller 106 that is an upper controller.

In addition, the vehicle controller 106 determines whether to accelerate or decelerate the towing vehicle based on detection signals transmitted from an accelerator pedal amount detection unit 107 and a brake pedal amount detection unit 108.

At this time, the accelerator pedal amount detection unit 107 may be an accelerator pedal position sensor (APS), and the brake pedal amount detection unit 108 may be a brake pedal position sensor (BPS).

The hybrid electric vehicle or the electric vehicle that is the towed vehicle 200 is equipped with a motor 202 and a battery 203, and also includes a second motor controller 205 configured to control the motor 202.

In particular, the towing vehicle 100 includes a towing mode selection switch 109 that may be operated when a battery of the towed vehicle 200 needs to be charged, and the vehicle controller 106 of the towing vehicle 100 and the second motor controller 205 of the towed vehicle 200 may be connected to be able to exchange signals by a general wireless communication device (not shown).

Here, the method of controlling the towing mode of the vehicle that is performed based on the above configuration will be described in detail.

Figure 3:
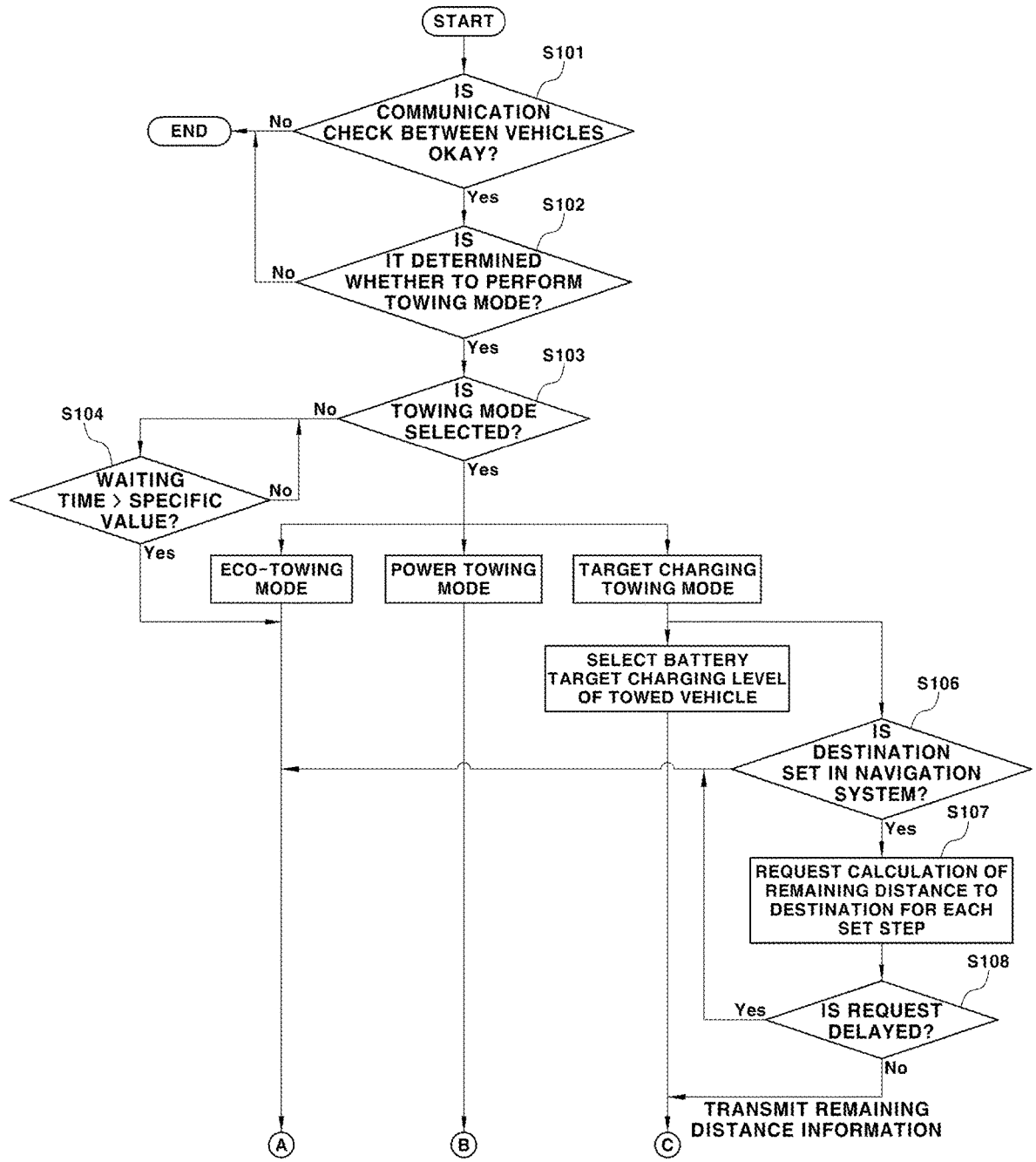
FIG. 3 is a flowchart showing a process of selecting one of an eco-towing mode, a power towing mode, and a target charging towing mode among towing modes of the vehicle according to the present disclosure.

FIG. 3 is a flowchart showing a process of selecting one of the eco-towing mode, the power towing mode, and the target charging towing mode among towing modes of the vehicle according to the present disclosure.

First, since the battery of the towed vehicle 200 needs to be charged when the towing vehicle 100, which is the hybrid electric vehicle, tows the towed vehicle 200, which is the hybrid electric vehicle or the electric vehicle, to the desired destination, whether a communication state between the towing vehicle 100 and the towed vehicle 200 is good is checked before the towing mode is selected (S101).

For example, a driver who rides the towing vehicle 100 may confirm whether a communication state between the vehicle controller 106 of the towing vehicle 100 and the second motor controller 205 of the towed vehicle 200 is connected to transmit a control signal using a predetermined menu displayed on a display of the towing vehicle 100.

Accordingly, when the communication state between the towing vehicle 100 and the towed vehicle 200 is good, it is determined whether to perform the towing mode in which the battery 203 of the towed vehicle 200 is charged (S102).

For example, when the communication state between the towing vehicle 100 and the towed vehicle 200 is good and the battery 203 of the towed vehicle 200 needs to be charged, the vehicle controller 106 recognizes that the towing mode in which the battery 203 of the towed vehicle 200 is charged is performed when the driver who rides the towing vehicle 100 operates the towing mode selection switch 109.

Subsequently, the driver may select one of the eco-towing mode, the power towing mode, and the target charging towing mode by operating the towing mode selection switch 109.

The eco-towing mode refers to a mode in which the battery 203 of the towed vehicle 200 is slowly charged in consideration of traveling efficiency of the towing vehicle 100 as a priority, and a charging speed and a charging amount of the battery 203 of the towed vehicle 200 may be most limited.

The power towing mode refers to a mode in which the charging speed and charging amount of the battery 203 of the towed vehicle 200 are considered as a priority in order to quickly charge the battery 203 of the towed vehicle 200 compared to the traveling efficiency of the towing vehicle 100.

The target charging towing mode is a mode in which the driver selects a battery charging level of the towed vehicle 200 upon long-distance traveling, and refers to a mode in which the battery of the towed vehicle 200 is charged step by step to a destination set in a navigation system.

Subsequently, the vehicle controller 106 of the towing vehicle 100 confirms whether any one of the eco-towing mode, the power towing mode, and the target charging towing mode has been selected (S103).

When a predetermined time elapses after the driver selects whether to perform the towing mode in which the battery 203 of the towed vehicle 200 is charged, the eco-towing mode may be automatically selected.

For example, after the driver selects whether to perform the towing mode in which the battery 203 of the towed vehicle 200 is charged, the vehicle controller 206 confirms whether a waiting time counted by a timer has exceeded a specific value (S104), and when it is confirmed that the waiting time has exceeded the specific value, the vehicle controller 206 recognizes that the eco-towing mode has been selected.

Accordingly, the vehicle controller 106 executes the eco-towing mode when the eco-towing mode is selected, and executes the power towing mode when the power towing mode is selected.

At this time, when the target charging towing mode is selected, the driver selects a target battery charging level of the towed vehicle displayed on the display (S105).

In addition, when the target charging towing mode is selected, the vehicle controller 106 requests whether to set a destination to the navigation system (S106), and requests a calculation of a remaining distance to the destination for each set stage (S107).

Accordingly, the vehicle controller 106 executes the target charging towing mode based on the target battery charging level selected in operation S105 and the remaining distance to the destination for the set stage received by the request in operation S107.

At this time, the vehicle controller 106 confirms that the request for calculating the remaining distance to the destination is delayed by a set time or more (S108), and when the request for calculating the remaining distance to the destination is delayed by the set time or more, the vehicle controller 106 executes the eco-towing mode.

Accordingly, when one of the eco-towing mode, the power towing mode, and the target charging towing mode in which the battery of the towed vehicle is charged is executed, it is possible to easily charge the battery of the towed vehicle by allowing the motor of the towed vehicle to output a charging torque for charging the battery in proportion to engine compensation power of the towing vehicle upon acceleration and constant speed traveling.

In addition, when one of the eco-towing mode, the power towing mode, and the target charging towing mode in which the battery of the towed vehicle is charged is executed, it is possible to easily charge the battery of the towed vehicle by allowing the motor of the towed vehicle to output a creep torque or a regenerative braking torque for charging the battery while allowing the motor of the towing vehicle to output the creep torque upon deceleration traveling.

Here, the process of charging the battery of the towed vehicle through the execution of the eco-towing mode will be described in detail as follows.

Eco-Towing Mode

Figure 4:
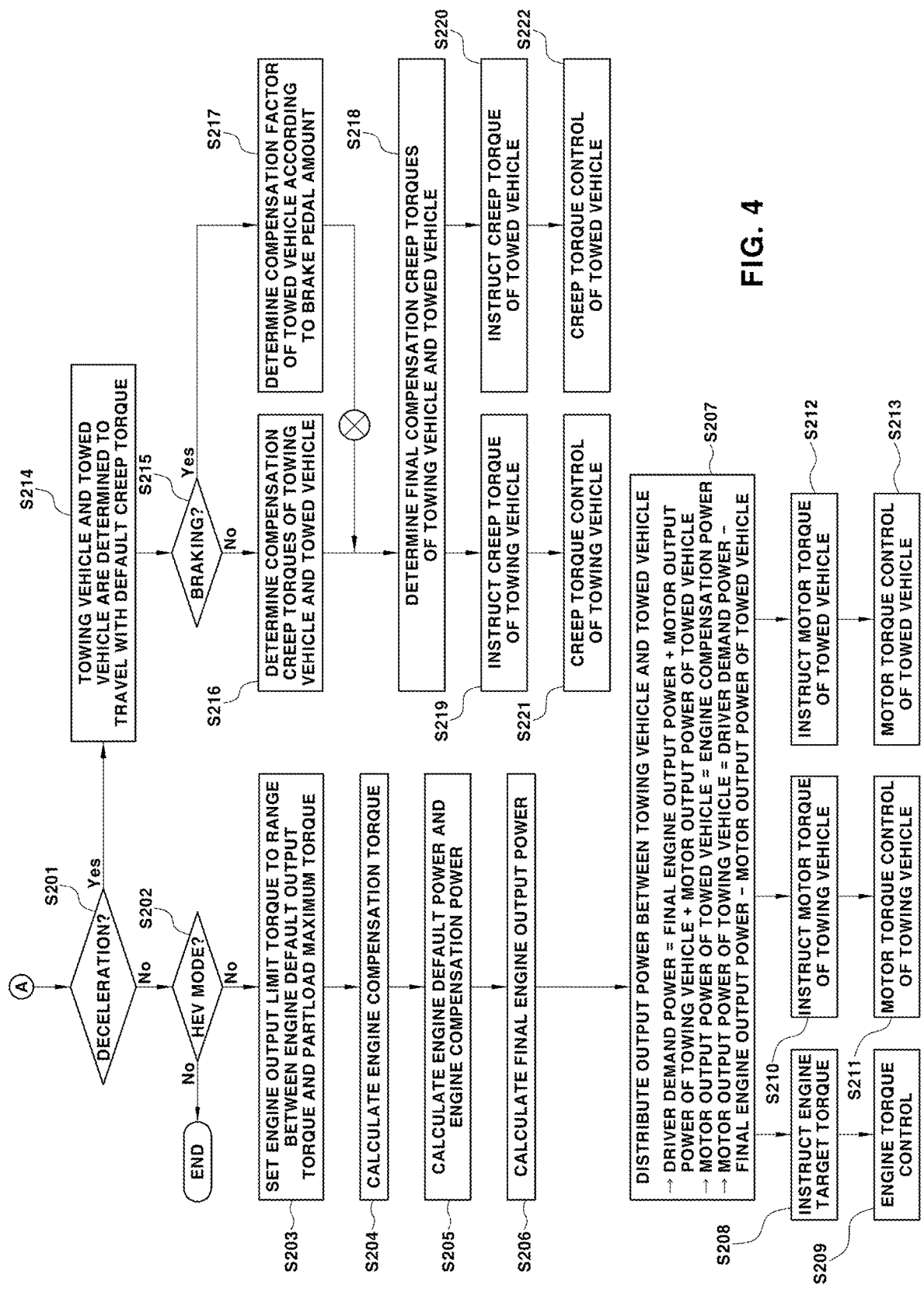
FIG. 4 is a flowchart showing a process of charging a battery of a towed vehicle by executing the eco-towing mode in the method of controlling the towing mode of the vehicle according to the present disclosure.

FIG. 4 is a flowchart showing the process of charging the battery of the towed vehicle through the execution of the eco-towing mode in the method of controlling the towing mode of the vehicle according to the present disclosure.

First, the vehicle controller 106 confirms whether to decelerate or accelerate the towing vehicle 100 (S201).

For example, the vehicle controller 106 may determine whether to accelerate or decelerate the towing vehicle based on the detection signals transmitted from the accelerator pedal amount detection unit 107 and the brake pedal amount detection unit 108.

When it is determined that the towing vehicle is in an acceleration state in operation S201, the vehicle controller 106 confirms whether a current driving mode of the towing vehicle 100, which is the hybrid electric vehicle, is a hybrid electric vehicle (HEV) mode in which the engine 101 and the motor 102 are used as a drive source at the same time (S202).

As the confirmation result in operation S202, when it is confirmed that the current driving mode of the towing vehicle is the HEV mode, the vehicle controller 106 sets the engine output limit torque to a range between an engine default output torque and a partload maximum torque (S203).

For example, referring to a torque-speed line diagram in FIG. 7, which is map data for controlling an optimum engine operation point of the towing vehicle, the engine output limit torque (indicated by a dotted line in FIG. 7) may be set to a value that is greater than the engine default output torque and smaller than the partload maximum torque.

On the other hand, when the current driving mode of the towing vehicle is not the HEV mode, the eco-towing mode is terminated.

Subsequently, the vehicle controller 106 calculates an engine compensation torque (S204).

The engine compensation torque may be calculated by subtracting the engine default output torque from the engine output limit torque.

In other words, when the towing vehicle 100 tows the towed vehicle 200, an engine torque increase of the towing vehicle 100 exceeding a motor torque for charging the battery of the towed vehicle 200 is required for the towing vehicle 100 to easily travel in a state of towing the towed vehicle 200 when the motor torques (the charging torque, the regenerative braking torque, the creep torque, and the like) for charging the battery 203 of the towed vehicle 200 are output, and thus the engine compensation torque is calculated as the engine torque increase.

Subsequently, the vehicle controller 106 calculates engine default power and engine compensation power α according to a predetermined method (S205), and calculates an engine final output power by adding the calculated engine default power and engine compensation power α (S206).

For example, the engine default power may be calculated by multiplying the engine default output torque by a current engine RPM, and the engine compensation power α may be calculated by multiplying the engine output limit torque by the current engine RPM.

In other words, the reason why the engine compensation power α is required is that when the towing vehicle 100 tows the towed vehicle 200, the engine final output power including additional engine compensation power of the towing vehicle 100 exceeding the motor power of the towed vehicle 200 is required for the towing vehicle 100 to easily travel in a state of towing the towed vehicle 200 when the motor torques (the charging torque, the regenerative braking torque, the creep torque, and the like), which are negative torques for charging the battery 203, are output from the motor of the towed vehicle 200.

At this time, the engine compensation power α of the towing vehicle 100 may be determined differently depending on a battery SOC level of the towing vehicle and a shape of a current traveling road.

In other words, the vehicle controller 106 may differently determine a magnitude of the engine compensation power α based on the battery SOC level of the towing vehicle provided from a battery management system (BMS), which is a battery controller, and shape information of the current traveling road provided from the navigation system.

For example, the engine compensation power α in the eco-towing mode may be determined as a value obtained by multiplying a first compensation factor β that varies for each battery SOC level of the towing vehicle by a second compensation factor γ that varies for each shape of the current traveling road so as to be determined differently depending on the battery SOC level of the towing vehicle and the shape of the current traveling road.

At this time, as shown in the graph of FIG. 8, the first compensation factor β may be applied as a gradually smaller value toward a Low area of a battery SOC, and applied as a gradually greater value toward a High area of the battery SOC with respect to a reference value in a Normal area of the battery SOC.

In addition, as shown in FIG. 9, the second compensation factor γ may be applied as a gradually greater value as the shape of the current traveling road is a downhill road with respect to a flat ground, and applied as a gradually smaller value as the shape of the current traveling road is an uphill road with respect to the flat ground.

Accordingly, the engine compensation power α in the eco-towing mode may be determined differently by multiplying the first compensation factor β and the second compensation factor γ, and as a result, the engine compensation power α may be calculated differently by multiplying an engine torque in the range between the engine default output and the engine output limit torque by the current engine RPM.

Next, the vehicle controller 106 performs a calculation for distributing the output power to the towing vehicle 100 and the towed vehicle 200 (S207).

In other words, the distribution of the output power to the engine 101 and the motor 102 of the towing vehicle 100 and the motor 202 of the towed vehicle 200 is determined.

At this time, when the towing vehicle 100 travels in a state of towing the towed vehicle 200, driver demand power is a value obtained by adding the engine final output power calculated in operation S206 to motor output power of the towing vehicle and motor output power of the towed vehicle.

In addition, since the motor output power of the towed vehicle 200 includes a negative charging torque for charging the battery of the towed vehicle, the motor output power of the towed vehicle 200 may be determined as power corresponding to the engine compensation power α calculated in operation S205.

In addition, the motor output power of the towing vehicle 100 may be determined as a value obtained by subtracting the engine final output power and the motor output power of the towed vehicle from the driver demand power.

Accordingly, a torque command for the engine final output power and motor output power of the towing vehicle and the motor output power of the towed vehicle is issued.

To this end, the vehicle controller 106 instructs the engine controller 104 to output an engine target torque for the engine final output power (S208), and an engine torque control is performed by the engine controller 104 (S209).

In addition, the vehicle controller 106 instructs the first motor controller 105 to output the motor torque for the motor output power of the towing vehicle (S210), and a motor torque control of the towing vehicle is performed by the first motor controller 105 (S211).

In addition, the vehicle controller 106 instructs the second motor controller 205 to output the motor torque for the motor output power of the towed vehicle through communication (S212), and a motor torque control of the towed vehicle is performed by the second motor controller 205 (S213).

Accordingly, when the towing vehicle 100 tows the towed vehicle 200, the motor torque of the towed vehicle 200 is output as a charging torque for charging the battery 203, so that it is possible to easily charge the battery of the towed vehicle.

In addition, even when the motor torque (charging torque), which is a negative torque for charging the battery of the towed vehicle 200, is output, the towing vehicle 100 travels with the engine final output power including the motor output power and the engine compensation power, and thus the towing vehicle 100 may easily travel in a state of towing the towed vehicle 200.

Meanwhile, as the confirmation result in operation S201, when it is determined that the towing vehicle 100 is in a deceleration state such as taking the driver's foot off an accelerator pedal, the towed vehicle as well as the towing vehicle is determined to travel with the default creep torque (S214).

In other words, when it is determined that the towing vehicle is in the deceleration state, the vehicle controller 106 determines the motor torque of the towing vehicle 100 as a preset default creep torque for creep traveling in a state in which the accelerator pedal and a brake pedal are taken off, and also determines the motor torque of the towed vehicle 200 as the default creep torque in order to implement a sense of deceleration.

At this time, an operation of determining a compensation creep torque for increasing or decreasing the default creep torques of the towing vehicle 100 and the towed vehicle 200 in a state in which a substantial braking in which the driver of the towing vehicle 100 depresses the brake pedal is not performed may be further performed (S216).

Figure 10:
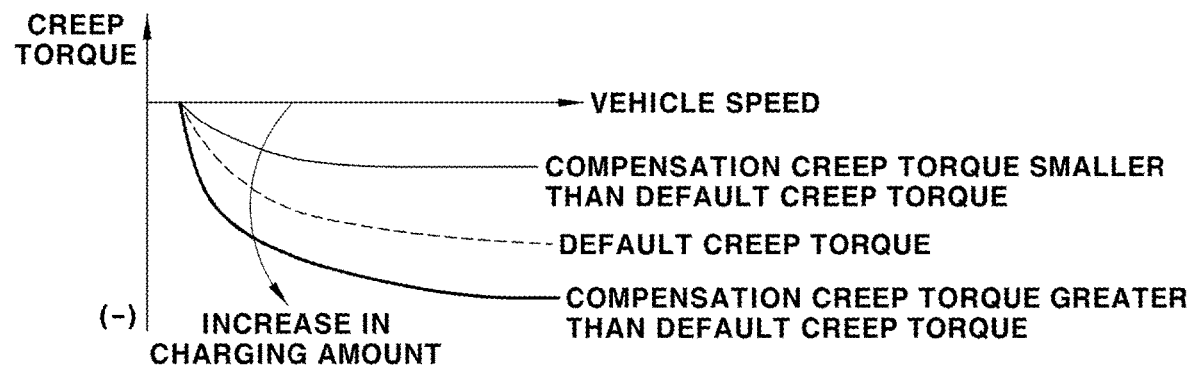
FIG. 10 is a graph showing an example of controlling creep torques of motors of the towing vehicle and the towed vehicle in the method of controlling the towing mode of the vehicle according to the present disclosure.

For example, when the driver arbitrarily operates a selection option displayed on the display in a state in which the default creep torque is set, as shown in FIG. 10, the vehicle controller 106 may determine the motor torques of the towing vehicle 100 and the towed vehicle 200 as a compensation creep torque increased by a set level from the default creep torque or a compensation creep torque decreased by a set level from the default creep torque.

In addition, the vehicle controller 106 may determine the motor torques of the towing vehicle 100 and the towed vehicle 200 as the compensation creep torque for increasing or decreasing the default creep torque according to a gradient of the road (uphill road or downhill road).

For example, based on a signal transmitted from the navigation system, the vehicle controller 106 may determine the compensation creep torque increased by the set level from the default creep torque when the gradient of the road is the uphill road, or the compensation creep torque decreased by the set level from the default creep torque when the gradient of the road is the downhill road.

At this time, the vehicle controller 106 confirms whether the substantial braking in which the driver of the towing vehicle 100 depresses the brake pedal is performed (S215), and when it is determined that the braking is performed, the vehicle controller 106 determines a compensation factor that varies depending on the brake pedal amount (S217).

Figure 11:
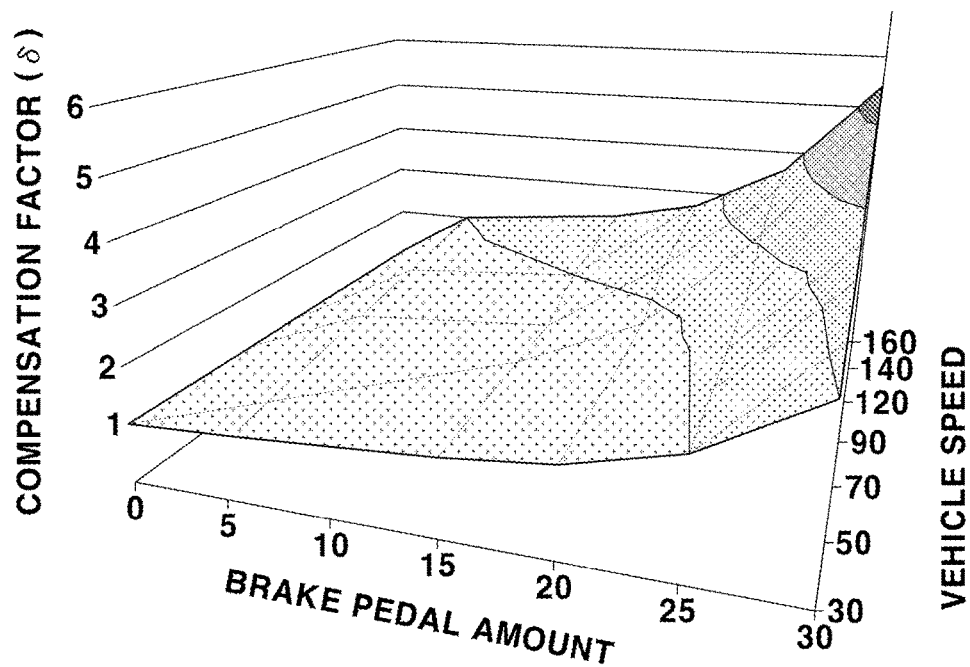
FIG. 11 is a graph showing that a creep torque compensation factor of the motor of the towed vehicle is determined according to a brake pedal amount of the towing vehicle in the method of controlling the towing mode of the vehicle according to the present disclosure.

For example, as shown in FIG. 11, the vehicle controller 106 may determine the compensation factor that varies depending on the brake pedal amount from the map data in which the compensation factor is set differently depending on the brake pedal amount and a vehicle speed.

Subsequently, the vehicle controller 106 determines final compensation creep torques of the towing vehicle and the towed vehicle (S218).

More specifically, the vehicle controller 106 determines the final compensation creep torques of the towing vehicle and the towed vehicle as the compensation creep torque determined in operation S216, or determines the final compensation creep torque of the towed vehicle as a value obtained by multiplying the compensation creep torque determined in operation S216 by the compensation factor determined in operation S217.

Subsequently, creep torque commands for allowing the motor of the towing vehicle and the motor of the towed vehicle to be controlled with the creep torques are issued (S219 and S220).

At this time, when the vehicle controller 106 issues the creep torque command to the first motor controller 105, a torque command corresponding to the final compensation creep torque determined in operation S218 is issued.

On the other hand, when the vehicle controller 106 issues the creep torque command to the second motor controller 205 through communication, the vehicle controller 106 issues the creep torque command corresponding to the compensation creep torque determined in operation S216 or a value obtained by multiplying the compensation creep torque determined in operation S216 by the compensation factor determined in operation S217.

Subsequently, the creep torque control for the motor of the towing vehicle 100 is performed by the first motor controller 105 (S221), and the creep torque control for the motor of the towed vehicle 200 is performed by the second motor controller 205 (S222).

Accordingly, when the towing vehicle 100 is decelerated while traveling in the state of towing the towed vehicle 200, the motor creep torque of the towed vehicle 200 is output as a regenerative braking torque for charging the battery 203, so that it is possible to easily charge the battery of the towed vehicle even upon deceleration traveling.

Here, the process of charging the battery of the towed vehicle through the execution of the power towing mode will be described in detail as follows.

Power Towing Mode

Figure 5:
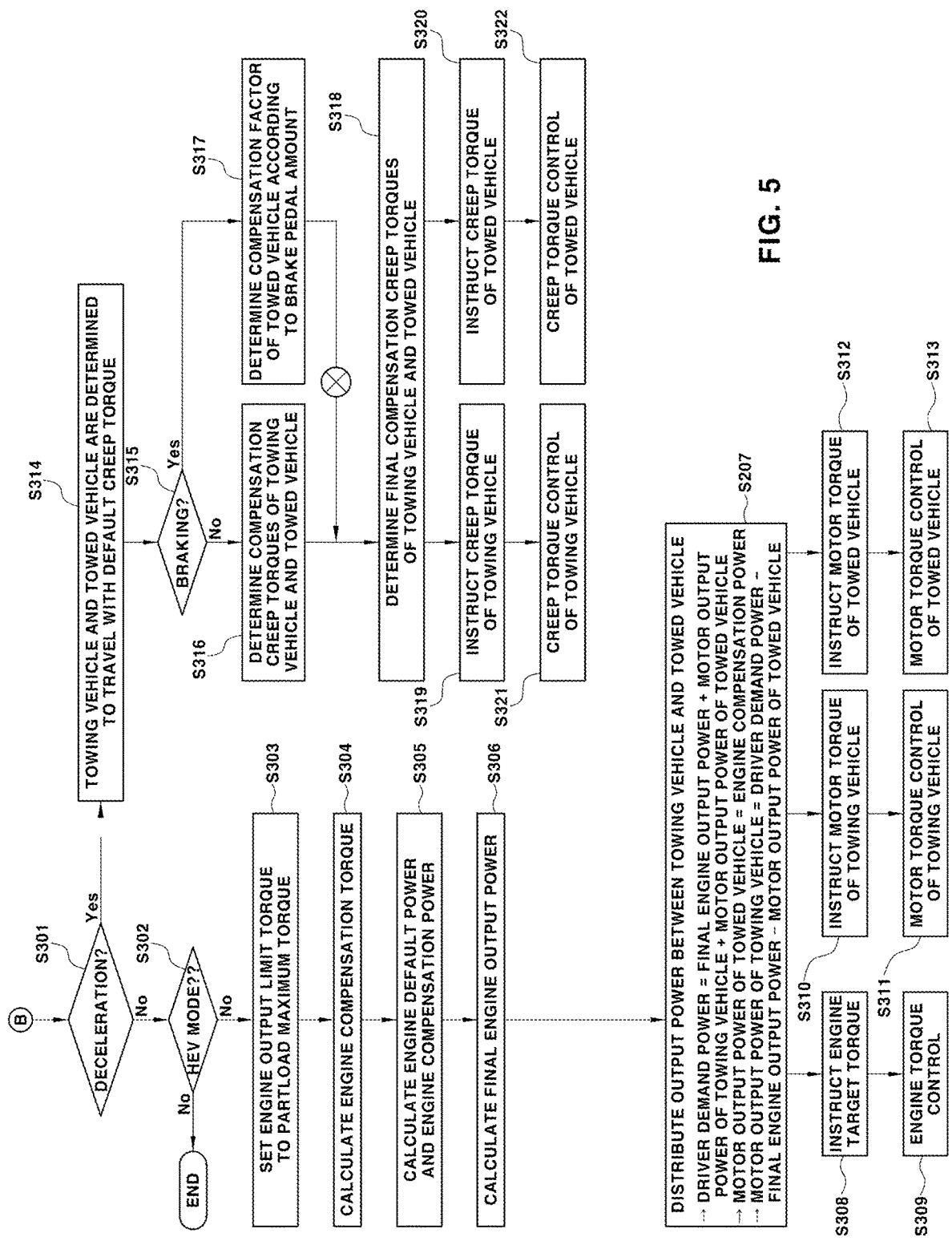
FIG. 5 is a flowchart showing a process of charging the battery of the towed vehicle by executing the power towing mode in the method of controlling the towing mode of the vehicle according to the present disclosure.

FIG. 5 is a flowchart showing the process of charging the battery of the towed vehicle through the execution of the power towing mode in the method of controlling the towing mode of the vehicle according to the present disclosure.

First, the vehicle controller 106 confirms whether to decelerate or accelerate the towing vehicle 100 (S301).

For example, the vehicle controller 106 may determine whether to accelerate or decelerate the towing vehicle based on the detection signals transmitted from the accelerator pedal amount detection unit 107 and the brake pedal amount detection unit 108.

When it is determined that the towing vehicle 100 is in an acceleration state in operation S301, the vehicle controller 106 confirms whether a current driving mode of the towing vehicle 100, which is the hybrid electric vehicle, is a hybrid electric vehicle (HEV) mode in which the engine 101 and the motor 102 are used as a drive source at the same time (S302).

As the confirmation result in operation S302, when it is confirmed that the current driving mode of the towing vehicle is the HEV mode in this preferred system, the vehicle controller 106 sets the engine output limit torque to the partload maximum torque (S303).

Figure 12:
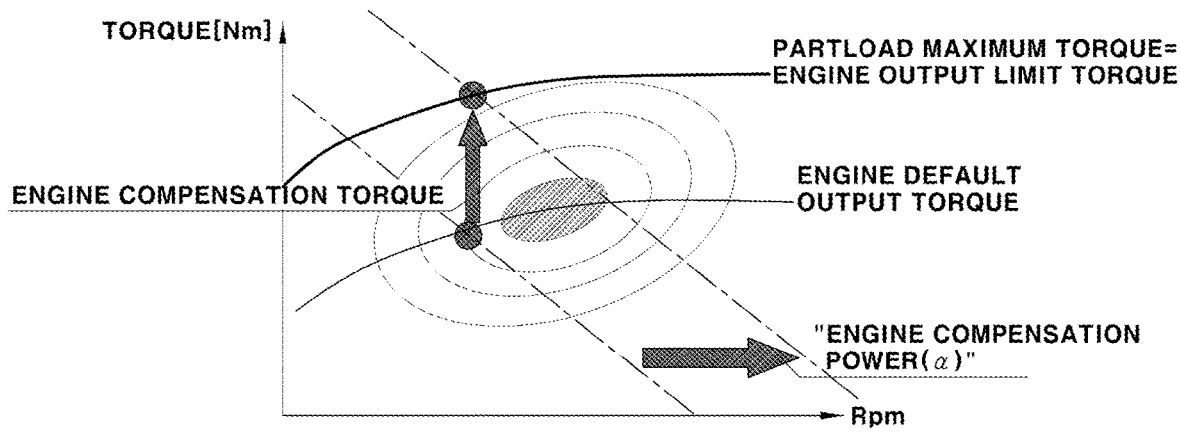
FIG. 12 is a torque-speed line diagram showing that the engine output limit torque and the engine compensation power are determined in the power towing mode in the method of controlling the towing mode of the vehicle according to the present disclosure.

For example, referring to the torque-speed line diagram in FIG. 12, which is the map data for controlling the optimum engine operation point of the towing vehicle, the engine output limit torque may be set to the partload maximum torque.

On the other hand, when the current driving mode of the towing vehicle is not the HEV mode, the power towing mode is terminated.

Subsequently, the vehicle controller 106 calculates the engine compensation torque (S304).

The engine compensation torque may be calculated by subtracting the engine default output torque from the engine output limit torque.

In other words, when the towing vehicle 100 tows the towed vehicle 200, an engine torque increase of the towing vehicle 100 exceeding the motor torque for charging the battery of the towed vehicle 200 is required to allow the towing vehicle 100 to easily travel in a state of towing the towed vehicle 200 when the motor torques (the charging torque, the regenerative braking torque, the creep torque, and the like) for charging the battery 203 of the towed vehicle 200 are output, and thus the engine compensation torque is calculated as the engine torque increase.

Subsequently, the vehicle controller 106 calculates engine default power and engine compensation power α according to a predetermined method (S305), and calculates an engine final output power by adding the calculated engine default power and engine compensation power α (S306).

For example, the engine default power may be calculated by multiplying the engine default output torque by the current engine RPM, and the engine compensation power α may be calculated by multiplying the engine output limit torque by the current engine RPM.

In other words, the reason that the engine compensation power α is required is that when the towing vehicle 100 tows the towed vehicle 200, the engine final output power including the additional engine compensation power of the towing vehicle 100 exceeding the motor power of the towed vehicle 200 is required to allow the towing vehicle 100 to easily travel in the state of towing the towed vehicle 200 when the motor torques (the charging torque, the regenerative braking torque, the creep torque, and the like), which are negative torques for charging the battery 203, are output from the motor of the towed vehicle 200.

At this time, the engine compensation power α of the towing vehicle 100 may be determined differently depending on the battery SOC level of the towing vehicle and the shape of the current traveling road.

In other words, the vehicle controller 106 may differently determine the magnitude of the engine compensation power α based on the battery SOC level of the towing vehicle provided from the battery management system (BMS), which is the battery controller, and shape information of the current traveling road provided from the navigation system.

For example, the engine compensation power α in the power towing mode may also be determined as a value obtained by multiplying the first compensation factor β that varies for each battery SOC level of the towing vehicle and the second compensation factor γ that varies for each shape of the current traveling road so as to be determined differently depending on the battery SOC level of the towing vehicle and the shape of the current traveling road.

Figure 13:
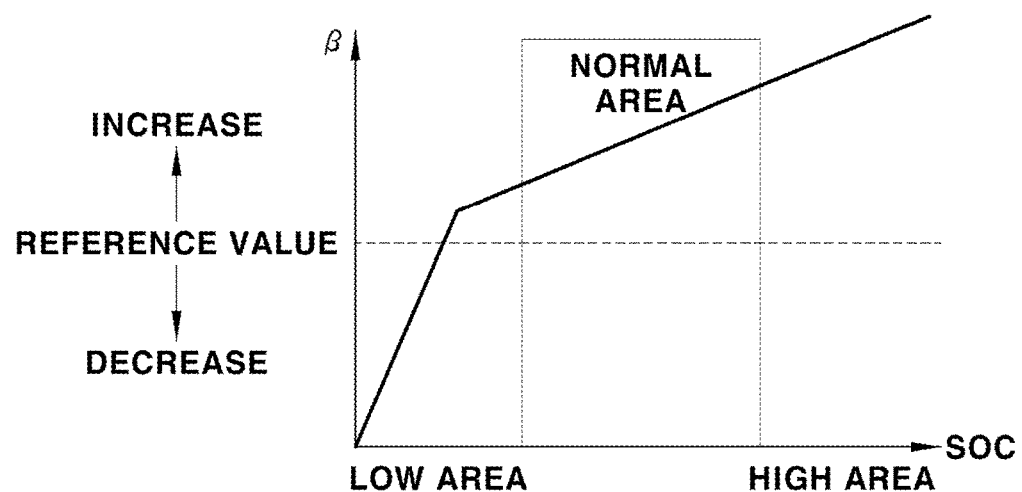
FIG. 13 is a graph showing the first compensation factor $\beta$ for each battery SOC level for determining the engine compensation power $\alpha$ of the towing vehicle in the power towing mode in the method of controlling the towing mode of the vehicle according to the present disclosure.

At this time, as shown in the graph of FIG. 13, the first compensation factor β may be applied as a gradually smaller value toward the Low area of the battery SOC smaller than the reference value, and applied as a gradually greater value toward the Normal area and the High area of the battery SOC with respect to the reference value in the Low area of the battery SOC.

In addition, as shown in FIG. 9, the second compensation factor γ may be applied as a gradually greater value as the shape of the current traveling road is the downhill rod with respect to the flat ground, and applied as a gradually smaller value as the shape of the current traveling road is the uphill road with respect to the flat ground.

Accordingly, the engine compensation power α in the power towing mode may be determined differently by multiplying the first compensation factor β and the second compensation factor γ, and as a result, the engine compensation power α may be calculated differently by multiplying the engine torque in the range between the engine default output and the engine output limit torque (the partload maximum torque) by the current engine RPM.

Next, the vehicle controller 106 performs a calculation for distributing the output power to the towing vehicle 100 and the towed vehicle 200 (S307).

In other words, the distribution of the output power to the engine 101 and the motor 102 of the towing vehicle 100 and the motor 202 of the towed vehicle 200 is determined.

At this time, when the towing vehicle 100 travels in a state of towing the towed vehicle 200, driver demand power is a value obtained by adding the engine final output power calculated in operation S306 to motor output power of the towing vehicle and motor output power of the towed vehicle.

In addition, since the motor output power of the towed vehicle 200 includes a negative charging torque for charging the battery of the towed vehicle, the motor output power of the towed vehicle 200 may be determined as power corresponding to the engine compensation power α calculated in operation S305.

In addition, the motor output power of the towing vehicle 100 may be determined as a value obtained by subtracting the engine final output power and the motor output power of the towed vehicle from the driver demand power.

Accordingly, a torque command for the engine final output power and motor output power of the towing vehicle and the motor output power of the towed vehicle is issued.

To this end, the vehicle controller 106 instructs the engine controller 104 to output an engine target torque for the engine final output power (S308), and an engine torque control is performed by the engine controller 104 (S309).

In addition, the vehicle controller 106 instructs the first motor controller 105 to output the motor torque for the motor output power of the towing vehicle (S310), and a motor torque control of the towing vehicle is performed by the first motor controller 105 (S311).

In addition, the vehicle controller 106 instructs the second motor controller 205 to output the motor torque for the motor output power of the towed vehicle through communication (S312), and a motor torque control of the towed vehicle is performed by the second motor controller 205 (S313).

Accordingly, when the towing vehicle 100 tows the towed vehicle 200, the motor torque of the towed vehicle 200 is output as a charging torque for charging the battery 203, so that it is possible to easily charge the battery of the towed vehicle.

In addition, even when the motor torque (charging torque), which is a negative torque for charging the battery of the towed vehicle 200, is output, the towing vehicle 100 travels with the engine final output power including the motor output power and the engine compensation power, and thus the towing vehicle 100 may easily travel in a state of towing the towed vehicle 200.

Meanwhile, as the confirmation result in operation S301, when it is determined that the towing vehicle 100 is in a deceleration state such as taking the driver's foot off the accelerator pedal, the towed vehicle as well as the towing vehicle is determined to travel with the default creep torque (S314).

In other words, when it is determined that the towing vehicle is in the deceleration state, the vehicle controller 106 determines the motor torque of the towing vehicle 100 as a preset default creep torque for creep traveling in a state in which the accelerator pedal and the brake pedal are taken off, and also determines the motor torque of the towed vehicle 200 as the default creep torque for implementing a sense of deceleration.

At this time, an operation of determining a compensation creep torque for increasing or decreasing the default creep torques of the towing vehicle 100 and the towed vehicle 200 in a state in which a substantial braking in which the driver of the towing vehicle 100 depresses the brake pedal is not performed may be further performed (S316).

For example, when the driver arbitrarily operates a selection option displayed on the display in a state in which the default creep torque is set, as shown in FIG. 10, the vehicle controller 106 may determine the motor torques of the towing vehicle 100 and the towed vehicle 200 as the compensation creep torque increased by the set level from the default creep torque or the compensation creep torque decreased by the set level from the default creep torque.

In addition, the vehicle controller 106 may determine the motor torques of the towing vehicle 100 and the towed vehicle 200 as the compensation creep torque for increasing or decreasing the default creep torque according to a gradient of the road (uphill road or downhill road).

For example, based on the signal transmitted from the navigation system, the vehicle controller 106 may determine the compensation creep torque increased by the set level from the default creep torque when the gradient of the road is the uphill road, or the compensation creep torque decreased by the set level from the default creep torque when the gradient of the road is the downhill road.

At this time, the vehicle controller 106 confirms whether the substantial braking in which the driver of the towing vehicle 100 depresses the brake pedal is performed (S315), and when it is determined that the braking is performed, the vehicle controller 106 determines the compensation factor that varies depending on the brake pedal amount (S317).

For example, as shown in FIG. 11, the vehicle controller 106 may determine the compensation factor that varies depending on the brake pedal amount from the map data in which the compensation factor is set differently depending on the brake pedal amount and the vehicle speed.

Subsequently, the vehicle controller 106 determines the final compensation creep torques of the towing vehicle and the towed vehicle (S318).

More specifically, the vehicle controller 106 determines the final compensation creep torques of the towing vehicle and the towed vehicle as the compensation creep torque determined in operation S316, or determines the final compensation creep torque of the towed vehicle as a value obtained by multiplying the compensation creep torque determined in operation S316 by the compensation factor determined in operation S317.

Subsequently, a creep torque command for allowing the motor of the towing vehicle and the motor of the towed vehicle to be controlled with the creep torque is issued (S319 and S320).

At this time, when the vehicle controller 106 issues the creep torque command to the first motor controller 105, a torque command corresponding to the final compensation creep torque determined in operation S318 is issued.

On the other hand, when the vehicle controller 106 issues the creep torque command to the second motor controller 205 through communication, the vehicle controller 106 issues the creep torque command corresponding to the compensation creep torque determined in operation S316 or the value obtained by multiplying the compensation creep torque determined in operation S316 by the compensation factor determined in operation S317.

Subsequently, the creep torque control for the motor of the towing vehicle 100 is performed by the first motor controller 105 (S321), and the creep torque control for the motor of the towed vehicle 200 is performed by the second motor controller 205 (S322).

Accordingly, when the towing vehicle 100 is decelerated while traveling in the state of towing the towed vehicle 200, the motor creep torque of the towed vehicle 200 is output as the regenerative braking torque for charging the battery 203, so that it is possible to easily charge the battery of the towed vehicle upon deceleration traveling.

Here, the process of charging the battery of the towed vehicle through the execution of the target charging towing mode will be described in detail as follows.

Target Charging Towing Mode

Figure 6:
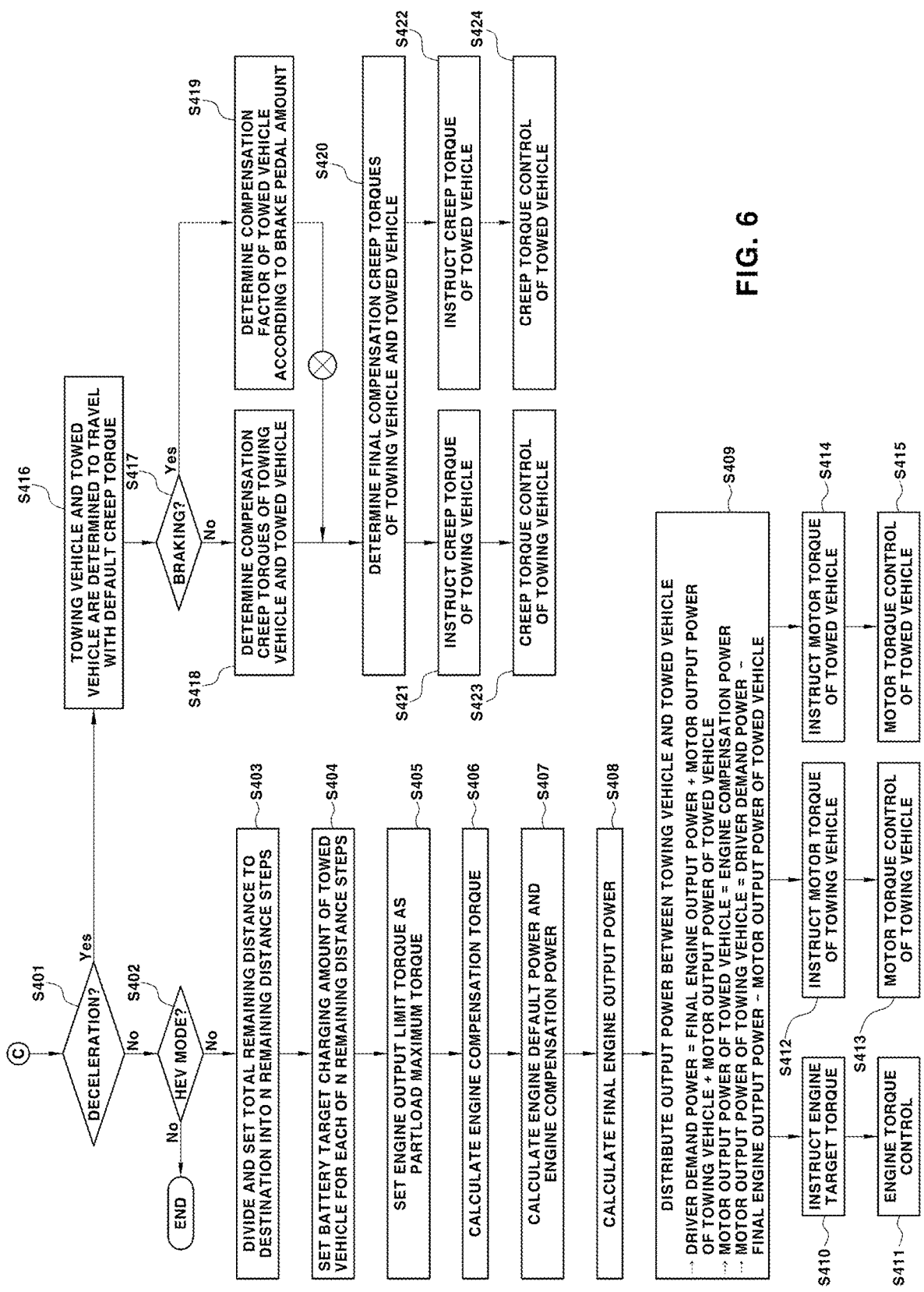
FIG. 6 is a flowchart showing a process of charging the battery of the towed vehicle by executing the target charging towing mode in the method of controlling the towing mode of the vehicle according to the present disclosure.

FIG. 6 is a flowchart showing the process of charging the battery of the towed vehicle through execution of the target charging towing mode in the method of controlling the towing mode of the vehicle according to the present disclosure.

First, the vehicle controller 106 confirms whether to decelerate or accelerate the towing vehicle 100 (S401).

For example, the vehicle controller 106 may determine whether to accelerate or decelerate the towing vehicle based on the detection signals transmitted from the accelerator pedal amount detection unit 107 and the brake pedal amount detection unit 108.

When it is determined that the towing vehicle 100 is in an acceleration state in operation S401, the vehicle controller 106 confirms whether a current driving mode of the towing vehicle 100, which is the hybrid electric vehicle, is a hybrid electric vehicle (HEV) mode in which the engine 101 and the motor 102 are used as a drive source at the same time (S402).

As the confirmation result in operation S402, when the current driving mode of the towing vehicle is not the HEV mode, the target charging towing mode is terminated.

As the confirmation result in operation S402, when it is confirmed that the current driving mode of the towing vehicle is the HEV mode, the vehicle controller 106 divides and sets the total remaining distance to the traveling destination of the vehicle into N remaining distance steps (S403).

Figure 14:
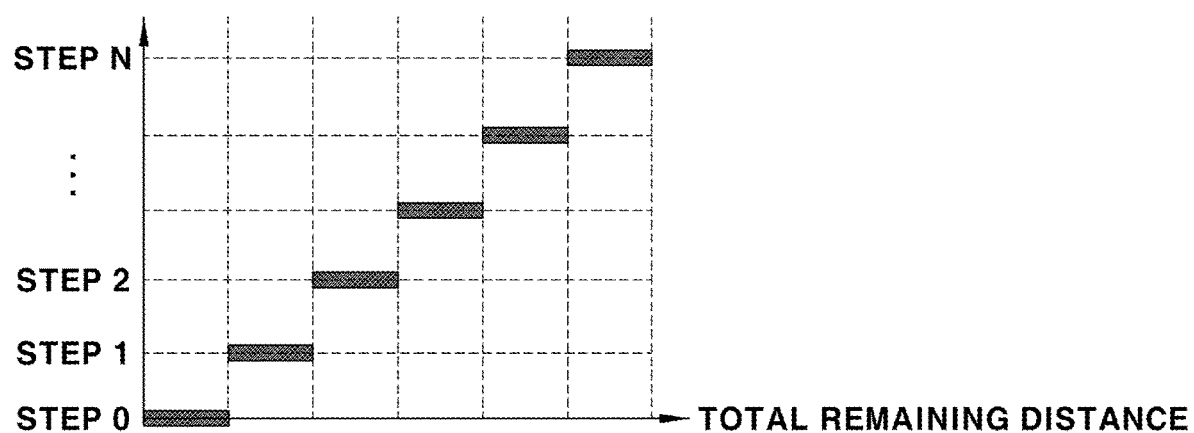
FIG. 14 is a graph showing an example of setting the engine output limit torque in the target charging towing mode in the method of controlling the towing mode of the vehicle according to the present disclosure.

For example, based on information on the total remaining distance to the destination provided by the navigation system, as shown in the graph of FIG. 14, the vehicle controller 106 divides and sets the total remaining distance into the same N remaining distance steps as each other.

Subsequently, a battery target charging amount of the towed vehicle for each of the N remaining distance steps is set (S404).

Figure 15:
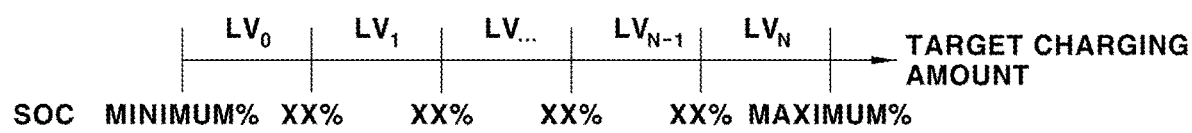
FIG. 15 is a graph showing an example of setting a target battery SOC level of the towed vehicle in the target charging towing mode in the method of controlling the towing mode of the vehicle according to the present disclosure.

For example, when the driver inputs the battery target charging amount of the towed vehicle through the menu displayed through the display of the towing vehicle, as shown in the graph of FIG. 15, the vehicle controller 106 may evenly divide and set the battery target charging amount of the towed vehicle into the N remaining distance steps set in operation S403.

When the battery target charging amount of the towed vehicle for each of the N remaining distance steps is completely set in operation S404, the vehicle controller 106 sets the engine output limit torque to the range between the engine default output torque and the partload maximum torque (S405).

For example, referring to a torque-speed line diagram in FIG. 7, which is map data for controlling an optimum engine operation point of the towing vehicle, the engine output limit torque (indicated by the dotted line in FIG. 7) may be set to the value that is greater than the engine default output torque and smaller than the partload maximum torque.

Subsequently, the vehicle controller 106 calculates the engine compensation torque (S406).

The engine compensation torque may be calculated by subtracting the engine default output torque from the engine output limit torque.

In other words, when the towing vehicle 100 tows the towed vehicle 200, an engine torque increase of the towing vehicle 100 exceeding the motor torque for charging the battery of the towed vehicle 200 is required to allow the towing vehicle 100 to easily travel in the state of towing the towed vehicle 200 when the motor torques (the charging torque, the regenerative braking torque, the creep torque, and the like) for charging the battery 203 of the towed vehicle 200 are output, and thus the engine compensation torque is calculated as the engine torque increase.

Subsequently, the vehicle controller 106 calculates the engine default power and the engine compensation power α according to the predetermined method (S407), and calculates the engine final output power by adding the calculated engine default power and engine compensation power α (S408).

For example, the engine default power may be calculated by multiplying the engine default output torque by the current engine RPM, and the engine compensation power α may be calculated by multiplying the engine output limit torque by the current engine RPM.

In other words, the reason that the engine compensation power α is required is that when the towing vehicle 100 tows the towed vehicle 200, the engine final output power including the additional engine compensation power of the towing vehicle 100 exceeding the motor power of the towed vehicle 200 is required to allow the towing vehicle 100 to easily travel in the state of towing the towed vehicle 200 when the motor torques (the charging torque, the regenerative braking torque, the creep torque, and the like), which are negative torques for charging the battery 203, are output from the motor of the towed vehicle 200.

At this time, the engine compensation power α of the towing vehicle 100 may be determined differently depending on the battery SOC level of the towing vehicle, the shape of the current traveling road, and the battery target charging amount of the towed vehicle for each of the N remaining distance steps.

In other words, the vehicle controller 106 may differently determine the magnitude of the engine compensation power α based on the battery SOC level of the towing vehicle provided from the battery management system (BMS), which is the battery controller, the information on the shape of the current traveling road provided from the navigation system, and the battery target charging amount of the towed vehicle for each of the N remaining distance steps set in operation S404.

Figure 16:
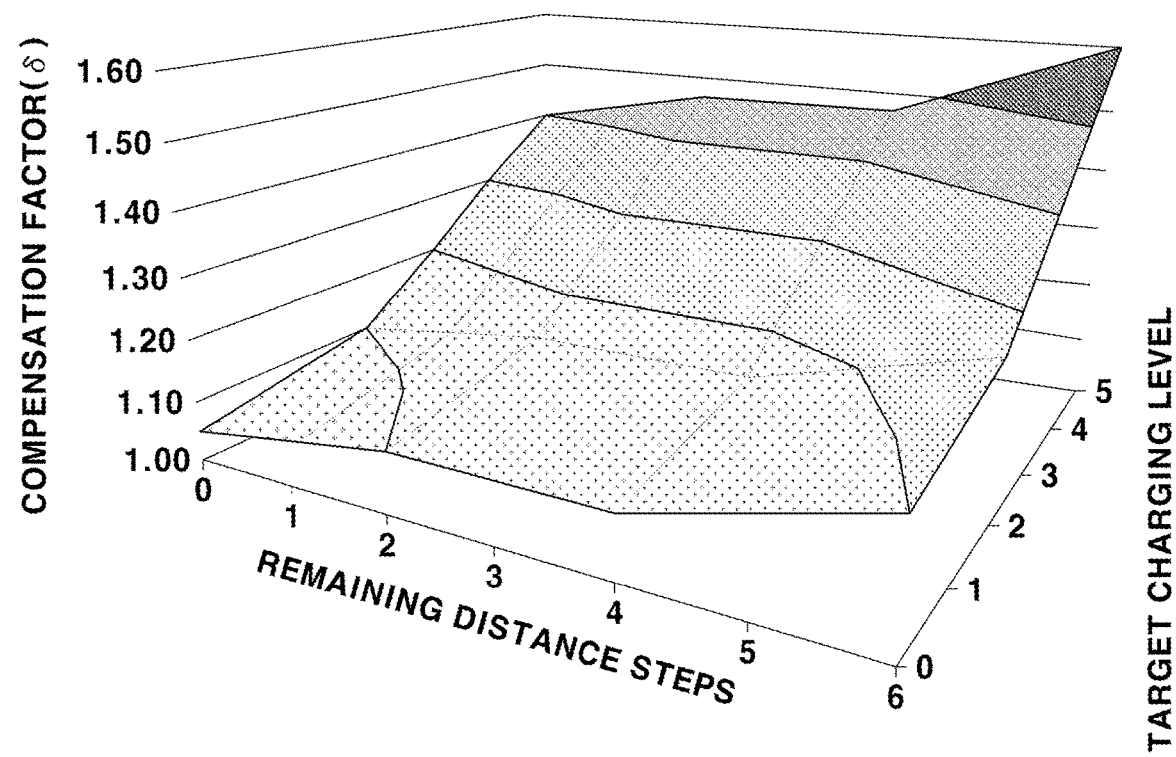
FIG. 16 is a graph showing an example of setting a third compensation factor $\delta$ for determining the engine compensation power $\alpha$ of the towing vehicle in the target charging towing mode according to a remaining distance to a destination and the target battery SOC level in the method of controlling the towing mode of the vehicle according to the present disclosure.

For example, the engine compensation power α in the target charging towing mode may be determined as the value obtained by multiplying the first compensation factor β that varies for each battery SOC level of the towing vehicle, the second compensation factor γ that varies for each shape of the current traveling road, and the third compensation factor δ determined according to the N remaining distance steps and the battery target charging amount from the map data shown in FIG. 16.

At this time, as shown in the graph of FIG. 8, the first compensation factor β may be applied as the gradually smaller value toward the Low area of the battery SOC, and applied as the gradually greater value toward the High area of the battery SOC with respect to the reference value in the Normal area of the battery SOC.

In addition, as shown in FIG. 9, the second compensation factor γ may be applied to the gradually greater value as the shape of the current traveling road is the downhill road with respect to the flat ground, and applied as the gradually smaller value as the shape of the current traveling road is the uphill road with respect to the flat ground.

In addition, as shown in FIG. 16, the third compensation factor δ may be applied as a gradually greater value as the target charging amount increases.

Accordingly, the engine compensation power α in the target charging towing mode may be determined differently by multiplying the first compensation factor β, the second compensation factor γ, and the third compensation factor δ, and as a result, the engine compensation power α may be calculated differently by multiplying the engine torque in the range between the engine default power and the engine output limit torque by the current engine RPM.

Next, the vehicle controller 106 performs the calculation for distributing the output power to the towing vehicle 100 and the towed vehicle 200 (S409).

In other words, the distribution of the output power to the engine 101 and the motor 102 of the towing vehicle 100 and the motor 202 of the towed vehicle 200 is determined.

At this time, when the towing vehicle 100 travels in a state of towing the towed vehicle 200, driver demand power is a value obtained by adding the engine final output power calculated in operation S408 to motor output power of the towing vehicle and motor output power of the towed vehicle.

In addition, since the motor output power of the towed vehicle 200 includes a negative charging torque for charging the battery of the towed vehicle, the motor output power of the towed vehicle 200 may be determined as power corresponding to the engine compensation power α calculated in operation S407.

In addition, the motor output power of the towing vehicle 100 may be determined as a value obtained by subtracting the engine final output power and the motor output power of the towed vehicle from the driver demand power.

Accordingly, a torque command for the engine final output power and motor output power of the towing vehicle and the motor output power of the towed vehicle is issued.

To this end, the vehicle controller 106 instructs the engine controller 104 to output an engine target torque for the engine final output power (S410), and an engine torque control is performed by the engine controller 104 (S411).

In addition, the vehicle controller 106 instructs the first motor controller 105 to output the motor torque for the motor output power of the towing vehicle (S412), and the motor torque control of the towing vehicle is performed by the first motor controller 105 (S413).

In addition, the vehicle controller 106 instructs the second motor controller 205 to output the motor torque for the motor output power of the towed vehicle through communication (S414), and the motor torque control of the towed vehicle is performed by the second motor controller 205 (S415).

Accordingly, when the towing vehicle 100 tows the towed vehicle 200 to the final destination, the motor torque of the towed vehicle 200 is output as the charging torque for charging the battery 203, so that it is possible to easily charge the battery of the towed vehicle according to the battery target charging amount for each of the N remaining distance steps.

In addition, even when the motor torque (charging torque), which is a negative torque for charging the battery of the towed vehicle 200, is output, the towing vehicle 100 travels with the engine final output power including the motor output power and the engine compensation power, and thus the towing vehicle 100 may easily travel in the state of towing the towed vehicle 200.

Meanwhile, as the confirmation result in operation S401, when it is determined that the towing vehicle 100 is in a deceleration state such as taking the driver's foot off the accelerator pedal, the towed vehicle as well as the towing vehicle is determined to travel with the default creep torque (S416).

In other words, when it is determined that the towing vehicle is in the deceleration state, the vehicle controller 106 determines the motor torque of the towing vehicle 100 as a preset default creep torque for creep traveling in the state in which the accelerator pedal and the brake pedal are taken off, and also determines the motor torque of the towed vehicle 200 as the default creep torque for implementing a sense of deceleration.

At this time, an operation of determining a compensation creep torque for increasing or decreasing the default creep torques of the towing vehicle 100 and the towed vehicle 200 in a state in which a substantial braking in which the driver of the towing vehicle 100 depresses the brake pedal is not performed may further be performed (S418).

For example, when the driver arbitrarily operates the selection option displayed on the display in the state in which the default creep torque is set, as shown in FIG. 10, the vehicle controller 106 may determine the motor torques of the towing vehicle 100 and the towed vehicle 200 as the compensation creep torque increased by the set level from the default creep torque or the compensation creep torque decreased by the set level from the default creep torque.

In addition, the vehicle controller 106 may determine the motor torques of the towing vehicle 100 and the towed vehicle 200 as the compensation creep torque for increasing or decreasing the default creep torque according to a gradient of the road (uphill road or downhill road).

For example, based on the signal transmitted from the navigation system, the vehicle controller 106 may determine the compensation creep torque increased by the set level from the default creep torque when the gradient of the road is the uphill road, or the compensation creep torque decreased by the set level from the default creep torque when the gradient of the road is the downhill road.

At this time, the vehicle controller 106 confirms whether the substantial braking in which the driver of the towing vehicle 100 depresses the brake pedal is performed (S417), and when it is determined that the braking is performed, the vehicle controller 106 determines a compensation factor that varies depending on the brake pedal amount (S419).

For example, as shown in FIG. 11, the vehicle controller 106 may determine the compensation factor that varies depending on the brake pedal amount from the map data in which the compensation factor is set differently depending on the brake pedal amount and the vehicle speed.

Subsequently, the vehicle controller 106 determines a final compensation creep torque of the towing vehicle and the towed vehicle (S420).

More specifically, the vehicle controller 106 determines the final compensation creep torques of the towing vehicle and the towed vehicle as the compensation creep torque determined in operation S216, or determines the final compensation creep torque of the towed vehicle as the value obtained by multiplying the compensation creep torque determined in operation S216 by the compensation factor determined in operation S419.

Subsequently, a creep torque command for allowing the motor of the towing vehicle and the motor of the towed vehicle to be controlled with the creep torque is issued (S421 and S422).

At this time, when the vehicle controller 106 issues the creep torque command to the first motor controller 105, a torque command corresponding to the final compensation creep torque determined in operation S420 is issued.

On the other hand, when the vehicle controller 106 issues the creep torque command to the second motor controller 205 through communication, the vehicle controller 106 issues the creep torque command corresponding to the compensation creep torque determined in operation S418 or a value obtained by multiplying the compensation creep torque determined in operation S418 by the compensation factor determined in operation S419.

Subsequently, the creep torque control for the motor of the towing vehicle 100 is performed by the first motor controller 105 (S423), and the creep torque control for the motor of the towed vehicle 200 is performed by the second motor controller 205 (S424).

Accordingly, when the towing vehicle 100 is decelerated while traveling in the state of towing the towed vehicle 200, the motor creep torque of the towed vehicle 200 is output as a regenerative braking torque for charging the battery 203, so that it is possible to easily charge the battery of the towed vehicle even upon deceleration traveling.

As described above, when the towing vehicle, which is the hybrid electric vehicle, tows the towed vehicle, which is the hybrid vehicle or the electric vehicle, to the desired destination, one of the eco-towing mode, the power towing mode, and the target charging towing mode for charging the battery of the towed vehicle is selected to allow the motor of the towed vehicle to output the charging torque for charging the battery upon acceleration and constant speed traveling, so that it is possible to easily charge the battery of the towed vehicle.

In addition, it is possible to easily charge the battery of the towed vehicle by allowing the motor of the towed vehicle to output the creep torque or the regenerative braking torque while allowing the motor of the towing vehicle to output the creep torque even upon deceleration.

Although one embodiment of the present disclosure has been described above in detail, the scope of the present disclosure is not limited to the above-described embodiments, and various modifications and improvements by those skilled in the art using the basic concept of the present disclosure as defined in the appended claims will also be included in the scope of the present disclosure.

What is claimed is:

1. A method of controlling a towing mode of a vehicle, the method comprising:
   determining whether to perform a towing mode in which a battery of a towed vehicle is charged as a towing vehicle tows the towed vehicle, the towed vehicle being a hybrid electric vehicle or an electric vehicle;
   executing one of: an eco-towing mode, a power towing mode, and a target charging towing mode for charging the battery of the towed vehicle when the towing mode is determined to be performed; and
   outputting a charging torque for charging the battery of the towed vehicle by a motor of the towed vehicle, the charging torque being in proportion to engine compensation power of the towing vehicle upon acceleration and constant speed traveling when any one of the eco-towing mode, the power towing mode, and the target charging towing mode is executed.

2. The method of claim 1 wherein the towing vehicle is a hybrid electric vehicle.

3. The method of claim 1, further comprising:
   outputting a creep torque or a regenerative braking torque for charging the battery of the towed vehicle by the motor of the towed vehicle upon deceleration traveling when any one of the eco-towing mode, the power towing mode, and the target charging towing mode is executed.

4. The method of claim 1, further comprising:
   checking whether a communication state between a vehicle controller of the towing vehicle and a motor controller of the towed vehicle is good before the determining of whether to perform the towing mode step.

5. The method of claim 1, wherein after the towing mode in which the battery of the towed vehicle is charged is determined to be performed, the eco-towing mode is automatically executed when a predetermined time elapses.

6. The method of claim 1, wherein executing the eco-towing mode step includes:
   confirming whether to decelerate or accelerate the towing vehicle;
   confirming whether a current driving mode of the towing vehicle is in a Hybrid Electric Vehicle (HEV) mode when it is determined that the towing vehicle is in an acceleration state;
   setting an engine output limit torque to a range between an engine default output torque and a partload maximum torque when it is confirmed that the current driving mode of the towing vehicle is in the HEV mode;
   calculating engine default power and engine compensation power, and calculating engine final output power by adding the engine default power and the engine compensation power;
   determining a distribution of an output power to an engine and a motor of the towing vehicle, and a motor of the towed vehicle; and
   performing an engine torque control for the engine final output power, a motor torque control for the motor output power of the towing vehicle, and a motor torque control as a charging torque for charging the battery of the towed vehicle according to the distribution determination of the output power.

7. The method of claim 6, wherein the engine compensation power is determined as a value obtained by: multiplying a first compensation factor that varies for each battery state of charge (SOC) level of the towing vehicle and a second compensation factor that varies for each shape of a current traveling road so as to be determined differently depending on a current battery SOC level of the towing vehicle and the shape of the current traveling road.

8. The method of claim 7,
   wherein the first compensation factor is applied as a gradually smaller value toward a Low area of a battery SOC, and the first compensation factor is applied as a gradually greater value toward a High area of the battery SOC with respect to a reference value in a Normal area of the battery SOC, and
   wherein the second compensation factor is applied as a gradually greater value as the shape of the current traveling road is a downhill road with respect to a flat ground, and the second compensation factor is applied as a gradually smaller value as the shape of the current traveling road is an uphill road with respect to the flat ground.

9. The method of claim 6, wherein the motor output power including the battery charging torque of the towed vehicle is determined as power corresponding to the engine compensation power.

10. The method of claim 6, further comprising:
    determining a motor torque of the towing vehicle as a preset default creep torque and determining a motor torque of the towed vehicle as the default creep torque in order to implement a sense of deceleration, when it is determined that the towing vehicle is in a deceleration state;
    determining a compensation creep torque for increasing or decreasing the default creep torque;
    determining a compensation factor that varies depending on a brake pedal amount upon braking in which a brake pedal is depressed;
    determining final compensation creep torques of the towing vehicle and the towed vehicle as the compensation creep torque, or determining the final compensation creep torque of the towed vehicle as a value obtained by multiplying the compensation creep torque by the compensation factor;

performing a creep torque control of the motor of the towing vehicle and a creep torque control of the motor of the towed vehicle to a level of the final compensation creep torque; and outputting a regenerative braking torque for charging the battery from the motor of the towed vehicle.

11. The method of claim 1, wherein executing the power towing mode step includes:

confirming whether to decelerate or accelerate the towing vehicle;

confirming whether a current driving mode of the towing vehicle is an HEV mode when it is determined that the towing vehicle is in an acceleration state;

setting an engine output limit torque as a partload maximum torque when it is confirmed that a current driving mode of the towing vehicle is the HEV mode;

calculating engine default power and engine compensation power, and calculating engine final output power by adding the engine default power and the engine compensation power;

determining a distribution of an output power to an engine and a motor of the towing vehicle, and a motor of the towed vehicle; and performing an engine torque control for the engine final output power, a motor torque control for the motor output power of the towing vehicle, and a motor torque control as a charging torque for charging the battery of the towed vehicle according to the distribution determination of the output power.

12. The method of claim 11, wherein the engine compensation power is determined as a value obtained by multiplying a first compensation factor that varies for each battery SOC level of the towing vehicle and a second compensation factor that varies for each shape of a current traveling road so as to be determined differently depending on the battery SOC level of the towing vehicle and the shape of the current traveling road.

13. The method of claim 12, wherein the first compensation factor is applied as a gradually smaller value toward a Low area of a battery SOC smaller than a reference value, and the first compensation factor is applied as a gradually greater value toward a Normal area and a High area of the battery SOC with respect to the reference value in the Low area of the battery SOC, and wherein the second compensation factor is applied as a gradually greater value as the shape of the current traveling road is a downhill road with a flat ground, and the second compensation factor is applied as a gradually smaller value as the shape of the current traveling road is an uphill road with respect to the flat ground.

14. The method of claim 11, wherein the motor output power including the battery charging torque of the towed vehicle is determined as power corresponding to the engine compensation power.

15. The method of claim 11, further comprising:

determining a motor torque of the towing vehicle as a preset default creep torque and determining a motor torque of the towed vehicle as the default creep torque in order to implement a sense of deceleration when it is determined that the towing vehicle is in a deceleration state;

determining a compensation creep torque for increasing or decreasing the default creep torque;

determining a compensation factor that varies depending on a brake pedal amount upon braking in which a brake pedal is depressed;

determining final compensation creep torques of the towing vehicle and the towed vehicle as the compensation creep torque, or determining the final compensation creep torque of the towed vehicle as a value obtained by multiplying the compensation creep torque by a compensation factor;

performing a creep torque control of the motor of the towing vehicle and a creep torque control of the motor of the towed vehicle to a level of the final compensation creep torque; and outputting a regenerative braking torque for charging the battery from the motor of the towed vehicle.

16. The method of claim 1, wherein executing the target charging towing mode includes:

confirming whether to decelerate or accelerate the towing vehicle;

confirming whether a current driving mode of the towing vehicle is an HEV mode when it is determined that the towing vehicle is in an acceleration state;

dividing and setting a total remaining distance to a destination into N remaining distance steps, and setting a battery target charging amount of the towed vehicle for each of the N remaining distance steps when it is confirmed that the current driving mode of the towing vehicle is in an HEV mode;

setting an engine output limit torque of the towing vehicle to a range between an engine default output torque and a partload maximum torque;

calculating engine default power and engine compensation power, and calculating engine final output power by adding the engine default power and the engine compensation power;

determining a distribution of an output power to an engine and a motor of the towing vehicle, and a motor of the towed vehicle; and performing an engine torque control for the engine final output power, a motor torque control for the motor output power of the towing vehicle, and a motor torque control as a charging torque for charging the battery of the towed vehicle according to the distribution determination of the output power.

17. The method of claim 16, wherein the engine compensation power is determined as a value obtained by multiplying a first compensation factor that varies for each battery SOC level of the towing vehicle, a second compensation factor that varies for each shape of a current traveling road, and a third compensation factor determined depending on the N remaining distance steps and a battery target charging amount.

18. The method of claim 17, wherein the first compensation factor is applied as a gradually smaller value toward a Low area of a battery SOC, and the first compensation factor is applied as a gradually greater value toward a High area of the battery SOC with respect to a reference value in a Normal area of the battery SOC, and wherein the second compensation factor is applied as a gradually greater value as the shape of the current traveling road is a downhill road with respect to a flat ground, and the second compensation factor applied as a gradually smaller value as the shape of the current traveling road is an uphill road with respect to the flat ground.

19. The method of claim 16, wherein the motor output power including the battery charging torque of the towed vehicle is determined as power corresponding to the engine compensation power.

20. The method of claim 16, further comprising:
- determining a motor torque of the towing vehicle as a preset default creep torque and determining a motor torque of the towed vehicle as the default creep torque in order to implement a sense of deceleration when it is determined that the towing vehicle is in a deceleration state;
- determining a compensation creep torque for increasing or decreasing the default creep torque;
- determining a compensation factor that varies depending on a brake pedal amount upon braking in which a brake pedal is depressed;
- determining final compensation creep torques of the towing vehicle and the towed vehicle as the compensation creep torque, or determining the final compensation creep torque of the towed vehicle as a value obtained by multiplying the compensation creep torque by the compensation factor;
- performing a creep torque control of the motor of the towing vehicle and a creep torque control of the motor of the towed vehicle to a level of the final compensation creep torque; and
- outputting a regenerative braking torque for charging the battery from the motor of the towed vehicle.

\* \* \* \* \*